United States Patent
Iyer et al.

(10) Patent No.: US 11,240,171 B2
(45) Date of Patent: Feb. 1, 2022

(54) METHOD AND SYSTEM FOR MANAGING MULTIMEDIA SERVICES

(71) Applicant: ANI TECHNOLOGIES PRIVATE LIMITED, Karnataka (IN)

(72) Inventors: Sriram V. Iyer, Karnataka (IN); Vasuki K. Setlur, Karnataka (IN); Arun Samudrala, Karnataka (IN)

(73) Assignee: ANI Technologies Pvt. Ltd., Bengaluru (IN)

( * ) Notice: Subject to any disclaimer, the term of this patent is extended or adjusted under 35 U.S.C. 154(b) by 134 days.

(21) Appl. No.: 16/195,099

(22) Filed: Nov. 19, 2018

(65) Prior Publication Data

US 2019/0158421 A1 May 23, 2019

(30) Foreign Application Priority Data

Nov. 23, 2017 (IN) .............................. 201741042058

(51) Int. Cl.
*H04L 12/913* (2013.01)
*H04L 29/08* (2006.01)
*H04L 12/927* (2013.01)

(52) U.S. Cl.
CPC .......... *H04L 47/724* (2013.01); *H04L 47/805* (2013.01); *H04L 67/12* (2013.01)

(58) Field of Classification Search
CPC ..... H04L 47/724; H04L 47/805; H04L 67/12; H04L 47/726
See application file for complete search history.

(56) References Cited

U.S. PATENT DOCUMENTS

| | | | |
|---|---|---|---|
| 9,271,255 B1* | 2/2016 | Jones | H04W 76/15 |
| 9,363,710 B1 | 6/2016 | Ganesh et al. | |
| 9,576,474 B2 | 2/2017 | Macdonald et al. | |
| 2010/0091722 A1* | 4/2010 | Takamatsu | H04L 5/0007 370/329 |
| 2011/0110397 A1* | 5/2011 | Mochizuki | H04W 28/20 375/130 |
| 2014/0059238 A1* | 2/2014 | Mela | H04L 65/1069 709/227 |
| 2014/0235242 A1* | 8/2014 | Granzow | H04W 48/17 455/436 |

(Continued)

*Primary Examiner* — Hitesh Patel
*Assistant Examiner* — Sujana Khakural
(74) *Attorney, Agent, or Firm* — Chip Law Group

(57) ABSTRACT

A method for managing multimedia services includes transmitting a first request by a first device to a communication network for reserving a sub-channel of a communication channel for a multimedia service. The first device transmits the first request when the multimedia service is initiated at a second device. The first device communicates with the first communication network by way of the communication channel. The first device receives data associated with the multimedia service from the second device. The first device receives a first acknowledgement from the first communication network. The first acknowledgement indicates a reservation of the sub-channel for the multimedia service. The first device maps the multimedia service to the sub-channel based on the first acknowledgement. The first device transmits the data over the sub-channel, thereby managing a quality of service for the multimedia service.

18 Claims, 8 Drawing Sheets

(56) References Cited

U.S. PATENT DOCUMENTS

| | | | |
|---|---|---|---|
| 2015/0131517 A1* | 5/2015 | Chu | H04W 72/005 |
| | | | 370/312 |
| 2015/0215738 A1 | 7/2015 | Frusina et al. | |
| 2015/0223273 A1* | 8/2015 | Macdonald | G08C 17/02 |
| | | | 370/252 |
| 2018/0213296 A1* | 7/2018 | Kellar | H04N 21/6338 |
| 2018/0279249 A1* | 9/2018 | Lv | H04B 7/18545 |
| 2019/0132196 A1* | 5/2019 | Trivedi | H04W 74/02 |

\* cited by examiner

METHOD AND SYSTEM FOR MANAGING MULTIMEDIA SERVICES

CROSS-RELATED APPLICATIONS

This application claims priority of Indian Application Serial No. 201741042058, filed Nov. 23, 2017, the contents of which are incorporated herein by reference.

FIELD OF THE INVENTION

The present invention relates generally to multimedia services, and more particularly, to a method and system for managing quality of service for the multimedia services in a vehicular environment.

BACKGROUND

Customers generally avail various public and private transportation services for making trips to and from work or engaging in personal activities. Consequently, several vehicle service providers have implemented various plans to tempt the customers to utilize their transportation services. These plans predominantly concentrate on vehicle safety and security, efficiency, and customers' comfort. Some vehicle service providers have installed an entertainment system in their vehicles, i.e., an in-vehicle entertainment system, to provide a pleasant and joyful ride experience to the customers. Additionally, a few of these vehicle service providers have gone a step ahead by providing network connectivity to their customers by way of the in-vehicle entertainment system. These in-vehicle entertainment systems allow the customers to access various multimedia services that require network connectivity. For instance, a customer travelling in a vehicle may use the in-vehicle entertainment system to access an email service that requires network connectivity for its operation.

The customers generally access various multimedia services at one time. Typically, data associated with these multimedia services is transmitted and received over a communication channel, which is common to all the multimedia services. For instance, a customer accesses video conference call and email services, simultaneously. Thus, data associated with the video conference call and email services is transmitted and received over the communication channel, which is common to both the video conference call and email services. As a result, the data associated with the various multimedia services interferes and causes data corruption and loss.

A known technique to overcome the aforementioned problem is to transmit the data associated with the various multimedia services in a round robin fashion over the communication channel. This ensures that the data is not lost or corrupted. However, this may increase latency in the transmission and reception of the data. Hence, quality of service of the multimedia services degrades, which further causes inconvenience to a customer, who is accessing the various multimedia services, simultaneously.

In light of the foregoing, there exists a need for a technical solution that prevents data corruption and loss, and manages the quality of service for the various multimedia services to guarantee a pleasant experience to the customers travelling in the vehicle.

SUMMARY

In an embodiment of the present invention, a method for managing multimedia services is provided. A first device transmits a first request to a first communication network for reserving a sub-channel of a communication channel for a multimedia service. The first device transmits the first request, when the multimedia service is initiated at a second device. The first device communicates with the first communication network by way of the communication channel. The first device receives data associated with the multimedia service from the second device. The first device receives a first acknowledgement from the first communication network. The first acknowledgment indicates a reservation of the sub-channel for the multimedia service. The first device maps the multimedia service to the sub-channel based on the first acknowledgement. The first device transmits the data over the sub-channel, thereby managing a quality of service for the multimedia service.

In another embodiment of the present invention, a system for managing multimedia services is provided. The system includes a first device that includes a processor. The processor is configured to transmit a first request to a first communication network for reserving a sub-channel of a communication channel for a multimedia service. The processor transmits the first request, when the multimedia service is initiated at a second device. The first device communicates with the first communication network by way of the communication channel. The first device receives data associated with the multimedia service from the second device. The processor receives a first acknowledgement from the first communication network. The first acknowledgement indicates a reservation of the sub-channel for the multimedia service. The processor maps the multimedia service to the sub-channel based on the first acknowledgement. The processor transmits the data over the sub-channel, thereby managing a quality of service for the multimedia service.

Various embodiments of the present invention provide a method and system for managing multimedia services in a vehicular environment. A customer is travelling in a vehicle. The vehicle includes a first device and a second device. The first device communicates with a first communication network by way of a communication channel. The first device communicates with the second device by way of a second communication network. The customer initiates a multimedia service on the second device. The second device transmits a first notification to the first device to indicate the initiation of the multimedia service on the second device. The first device receives the first notification by way of the second communication network. In response to the first notification, the first device transmits a first request to the first communication network for reserving a sub-channel of the communication channel for the multimedia service. Based on the first request, the first communication network reserves the sub-channel. A bandwidth of the sub-channel is a part of the total bandwidth of the communication channel. The first communication network transmits a first acknowledgement to the first device to indicate a reservation of the sub-channel. Based on the first acknowledgement, the first device maps the sub-channel to the multimedia service. The first device receives data associated with the multimedia service from the second device by way of the second communication network. The first device transmits the data over the sub-channel to a server, thereby managing a quality of service for the multimedia service. Transmission of the data over the sub-channel prevents data corruption and loss, and reduces latency in the transmission of the data. Further, when the customer terminates the multimedia service on the second device, the second device transmits a second notification to the first device. The second notification indicates the termination of the multimedia service on the second device. In response to the second notification, the first device transmits a second request to the first communication network for releasing the sub-channel. Based on the second request, the first communication network releases the sub-channel and transmits a second acknowledgement to the first device. The second acknowledgement indicates a release of the sub-channel.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Figure 1:
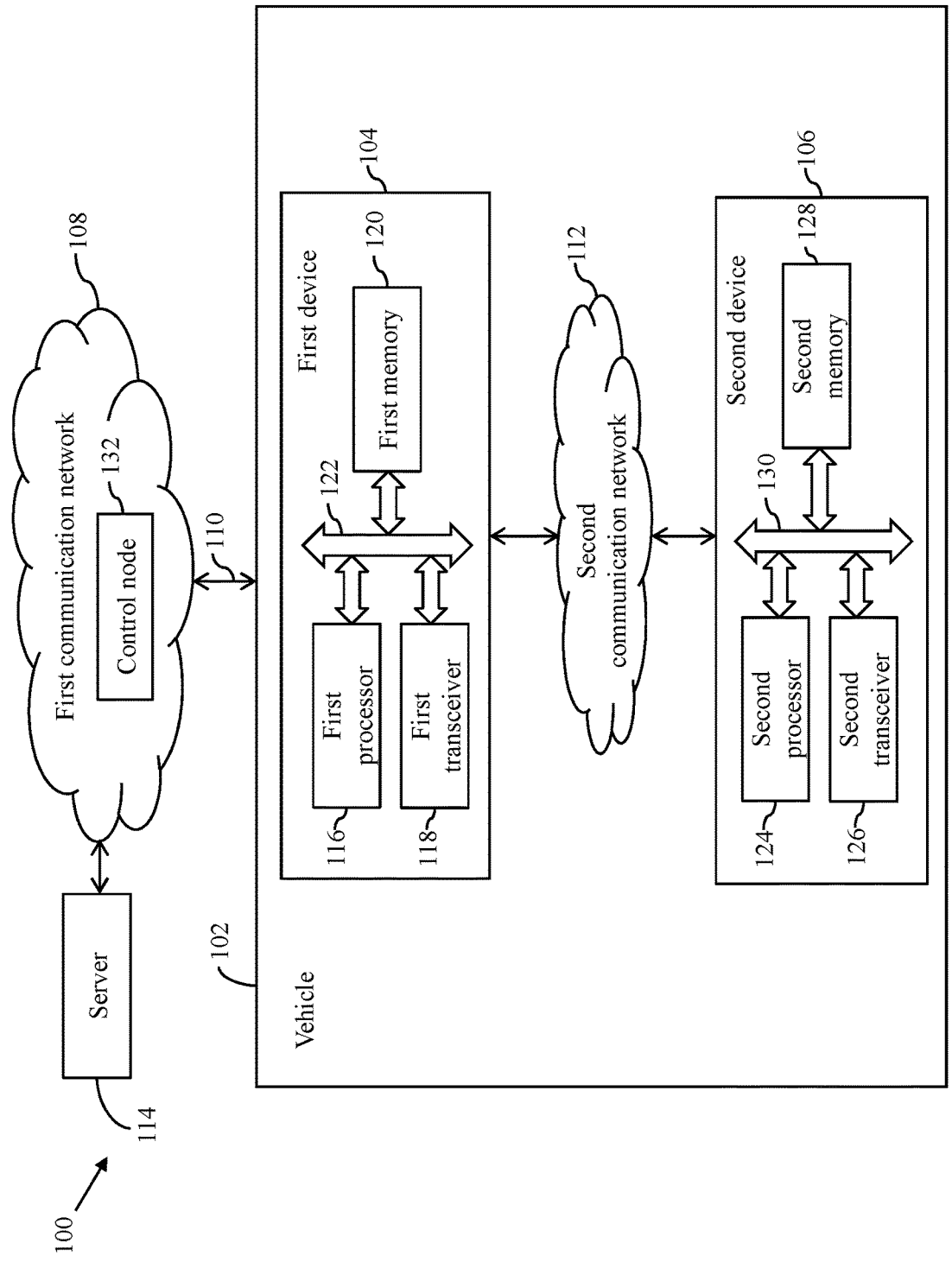
FIG. 1 is a block diagram that illustrates a system environment for managing multimedia services, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes a system for managing multimedia services. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Referring now to FIG. 1, a block diagram that illustrates a system environment 100 for managing multimedia services in accordance with an embodiment of the present invention is shown. The system environment 100 is implemented as a vehicular environment that includes a vehicle 102. The vehicle 102 includes first and second devices 104 and 106. The first device 104 communicates with a first communication network 108 by way of a communication channel 110 for managing the multimedia services. The second device 106 communicates with the first device 104 through a second communication network 112. The system environment 100 further includes a server 114.

The vehicle 102 is a means of transport that is deployed by a vehicle service provider, such as a taxicab provider, to provide ride services to customers. Examples of the vehicle 102 include an automobile, a bus, a train, an airplane, and the like. The customers may travel in the vehicle 102 to commute from a source location to a destination location. Various methods used by the vehicle service provider for providing ride services to the customers will be apparent to a person having skill in the relevant art.

In an embodiment, the first device 104 is a vehicle head unit. In another embodiment, the first device 104 is an external communication device that is installed in the vehicle 102. In such a scenario, the first device 104 is a smartphone, a tablet, a phablet, a personal digital assistant (PDA), and the like. The first device 104 manages the multimedia services that a customer (not shown) accesses on the second device 106. Examples of the multimedia services include an email service, a voice call service, a video conferencing service, a multimedia file access service, a website access service, and the like. The first device 104 includes a first processor 116, a first transceiver 118, and a first memory 120 that communicate with each other by way of a first bus 122.

The first processor 116 includes suitable logic, circuitry, and/or interfaces to execute instructions stored in the first memory 120 to manage the multimedia services. The first processor 116 transmits/receives data associated with the multimedia services to/from the second device 106 and the server 114 by way of the first transceiver 118. Examples of the first processor 116 includes an application-specific integrated circuit (ASIC) processor, a reduced instruction set computing (RISC) processor, a complex instruction set computing (CISC) processor, a field-programmable gate array (FPGA), and the like. It will be apparent to a person skilled in the art that the first processor 116 is compatible with multiple operating systems.

The first transceiver 118 includes suitable logic, circuitry, and/or interfaces to transmit or receive messages from various network components, such as the second device 106, the first communication network 108, and the server 114. Examples of the first transceiver 118 include an antenna, a radio frequency transceiver, a wireless transceiver, a Bluetooth transceiver, and the like. The first transceiver 118 communicates with the second device 106, the first communication network 108, and the server 114 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The first memory 120 includes suitable logic, circuitry, and/or interfaces to store instructions that enable the first processor 116 to manage the multimedia services. Further, the first memory 120 stores the data associated with the multimedia services. Examples of the first memory 120 include, but are not limited to, a random access memory (RAM), a read-only memory (ROM), a programmable ROM (PROM), and an erasable PROM (EPROM).

The second device 106 is a communication device which a customer travelling in the vehicle 102 uses to access the multimedia services. In one example, the customer travelling in the vehicle 102 may access an email service by using the second device 106. In another example, the customer may access a multimedia file access service to play a multimedia file, such as a television shows, e-books, songs, audiobooks, and the like, by using the second device 106. The customer may access various multimedia services simultaneously on the second device 106. Examples of the second device 106 include a smartphone, a personal digital assistant (PDA), a tablet, or any other portable communication device. The second device 106 includes a second processor 124, a second transceiver 126 and a second memory 128 that communicate with each other by way of a second bus 130.

The second processor 124 includes suitable logic, circuitry, and/or interfaces that enable the customer travelling in the vehicle 102 to access the multimedia services. The second processor 124 initiates and terminates each of the multimedia services based on a request from the customer. Examples of the second processor 124 include an ASIC processor, a RISC processor, a CISC processor, an FPGA, and the like. It will be apparent to a person skilled in the art that the second processor 124 is compatible with multiple operating systems.

The second transceiver 126 includes suitable logic, circuitry, and/or interfaces to transmit or receive messages from the first device 104. The second transceiver 126 communicates with the first transceiver 118 through the second communication network 112. Examples of the second transceiver 126 include an antenna, a radio frequency transceiver, a wireless transceiver, a Bluetooth transceiver, and the like. The second transceiver 126 communicates with the first transceiver 118 using various wired and wireless communication protocols, such as TCP/IP, UDP, 2G, 3G, 4G communication protocols, or any combination thereof.

The first communication network 108 is a medium through which content and messages are transmitted between various devices, such as the first device 104 and the server 114. The first communication network 108 has a control node 132. In one example, the control node 132 is a mobility management entity for the first communication network 108. The control node 132 controls the communication channel 110 based on one or more requests received from the first device 104 for managing the multimedia services that the customer accesses on the second device 106. In an embodiment, the communication channel 110 is a primary bearer channel or a primary bearer context. Examples of the first communication network 108 include, but are not limited to, a wireless fidelity (Wi-Fi) network, a light fidelity (Li-Fi) network, a local area network (LAN), a wide area network (WAN), a metropolitan area network (MAN), a satellite network, the internet, a radio frequency (RF) network, a high speed packet access (HSPA), or any combination thereof.

The second communication network 112 is a medium through which content and messages are transmitted between various devices, such as the first device 104 and the second device 106. Examples of the second communication network 112 include Wi-Fi network, a Bluetooth low-energy (BLE) network, a Li-Fi, a fiber optic network, a coaxial cable network, an infrared network, a hotspot network, a radio frequency (RF) network, or any combination thereof. Various devices in the system environment 100 may connect to the first and second communication networks 108 and 112 in accordance with various wired or wireless communication protocols, such as TCP/IP, UDP, 2G, 3G, 4G, LTE communication protocols, or any combination thereof.

The server 114 can be a content management server, web server, application server, client server and the like. Examples of the server 114 include, but are not limited to, a personal computer, a laptop, or a network of computer systems.

In operation, the customer travelling in the vehicle 102 uses the second device 106 to initiate a first multimedia service on the second device 106. For example, the customer may select the first multimedia service from various multimedia services that are available on the second device 106. Based on the selection, the first multimedia service is initiated on the second device 106. The second processor 124 transmits a first notification to the first processor 116 to indicate the initiation of the first multimedia service.

The first processor 116 receives the first notification by way of the second communication network 112. Based on the first notification, the first processor 116 transmits a first request to the first communication network 108 for reserving a sub-channel of the communication channel 110 for the first multimedia service. In an embodiment, the first processor 116 transmits the first request based on a first set of parameters associated with the first multimedia service. The first set of parameters may include a bandwidth requirement, a bit rate requirement, a throughput requirement, a priority level, and the like. In an embodiment, the first processor 116 receives the first set of parameters from the second processor 124. In another embodiment, the first set of parameters may be stored in the first memory 120. In an embodiment, the first processor 116 transmits the first set of parameters to the first communication network 108. In another embodiment, the first request includes the first set of parameters.

Based on the first request, the control node 132 of the first communication network 108 reserves the sub-channel of the communication channel 110 for the first multimedia service. In an embodiment, the sub-channel is a secondary bearer context. In other words, the control node 132 activates the secondary bearer context, i.e., the sub-channel. A bandwidth of the sub-channel is a part of a total bandwidth of the communication channel 110. The bandwidth of the sub-channel is reserved based on the first set of parameters associated with the first multimedia service. In one example, the control node 132 determines the bandwidth requirement of the first multimedia service based on the first set of parameters and reserves the sub-channel that serves the bandwidth requirement. In another example, the control node 132 determines the bit-rate requirement of the first multimedia service based on the first set of parameters and reserves the sub-channel that guarantees the corresponding bit-rate.

The control node 132 transmits a first acknowledgement to the first processor 116 to indicate a reservation of the sub-channel for the first multimedia service. The first transceiver 118 receives the first acknowledgement from the control node 132 of the first communication network 108. The first processor 116 maps the first multimedia service to the sub-channel based on the first acknowledgement. The first processor 116 stores information pertaining to the mapping of the first multimedia service to the sub-channel in the first memory 120. In one example, the first processor 116 stores the information pertaining to the mapping as an entry in a look-up table. The entry includes a multimedia service identification number of the first multimedia service and a sub-channel identification number of the sub-channel.

The second processor 124 transmits the data associated with the first multimedia service to the first processor 116 by way of the second communication network 112. Further, the data associated with the first multimedia service includes the multimedia service identification number. The first processor 116 identifies the multimedia service identification number associated with the data. Further, the first processor 116 retrieves the information pertaining to the mapping, such as the entry in the look-up table, from the first memory 120 to determine the sub-channel associated with the multimedia service identification number. After the determination of the sub-channel associated with the multimedia service identification number, the first transceiver 118 transmits the data associated with the first multimedia service to the server 114 over the sub-channel. Further, the first transceiver 118 receives the data associated with the first multimedia service from the server 114 over the sub-channel. Thus, the first processor 116 manages a quality of service for the first multimedia service by transmitting and receiving the data over the sub-channel.

Further, when the customer travelling in the vehicle 102 requests to terminate the first multimedia service on the second device 106, the second processor 124 transmits a second notification to the first processor 116. Based on the second notification, the first processor 116 transmits a second request to the first communication network 108 to release the sub-channel. The control node 132 of the first communication network 108 receives the second request and releases the sub-channel. In other words, the control node 132 deactivates the secondary bearer context, i.e., the sub-channel. The control node 132 further transmits a second acknowledgement to the first processor 116 to indicate a release of the sub-channel. The first processor 116 updates the information pertaining to the mapping of the first multimedia service to the sub-channel. In one example, the first processor 116 deletes the entry in the look-up table that includes the multimedia service identification number of the first multimedia service and the sub-channel identification number of the sub-channel.

In an embodiment, the first processor 116 may further transmit the second request to the first communication network 108 for releasing the sub-channel, when a ride of the customer ends in the vehicle 102. In an embodiment, the customer may access the first multimedia service and a second multimedia service, simultaneously. In such a scenario, the first processor 116 transmits the first request to first communication network 108 for reserving two sub-channels, one for each of the first and second multimedia services.

It will be apparent to a person skilled in the art that the system environment 100 may include multiple devices, such as the second device 106, connected to the first device 104 by way of the second communication network 112. In such a scenario, based on multimedia services initiated on the multiple devices, a sub-channel of the communication channel 110 may be reserved for each multimedia service, as explained in the foregoing description.

Thus, the system environment 100 provides a mechanism for managing multimedia services. The first device 104 manages the quality of service for the multimedia services that are initiated on the second device 106. Hence, a requirement for additional hardware to manage the multimedia services is overcome. Unlike conventional techniques, where the data associated with each multimedia service is transmitted in round robin fashion, the first device 104 manages the quality of service for each multimedia service by requesting the first communication network 108 to reserve a sub-channel for each of the multimedia services. The sub-channel allows the data associated with the corresponding multimedia service to be transmitted without corruption and loss. In addition, reserving the sub-channel improves the quality of service for the corresponding multimedia service by reducing the latency in the transmission of the data.

Figure 2:
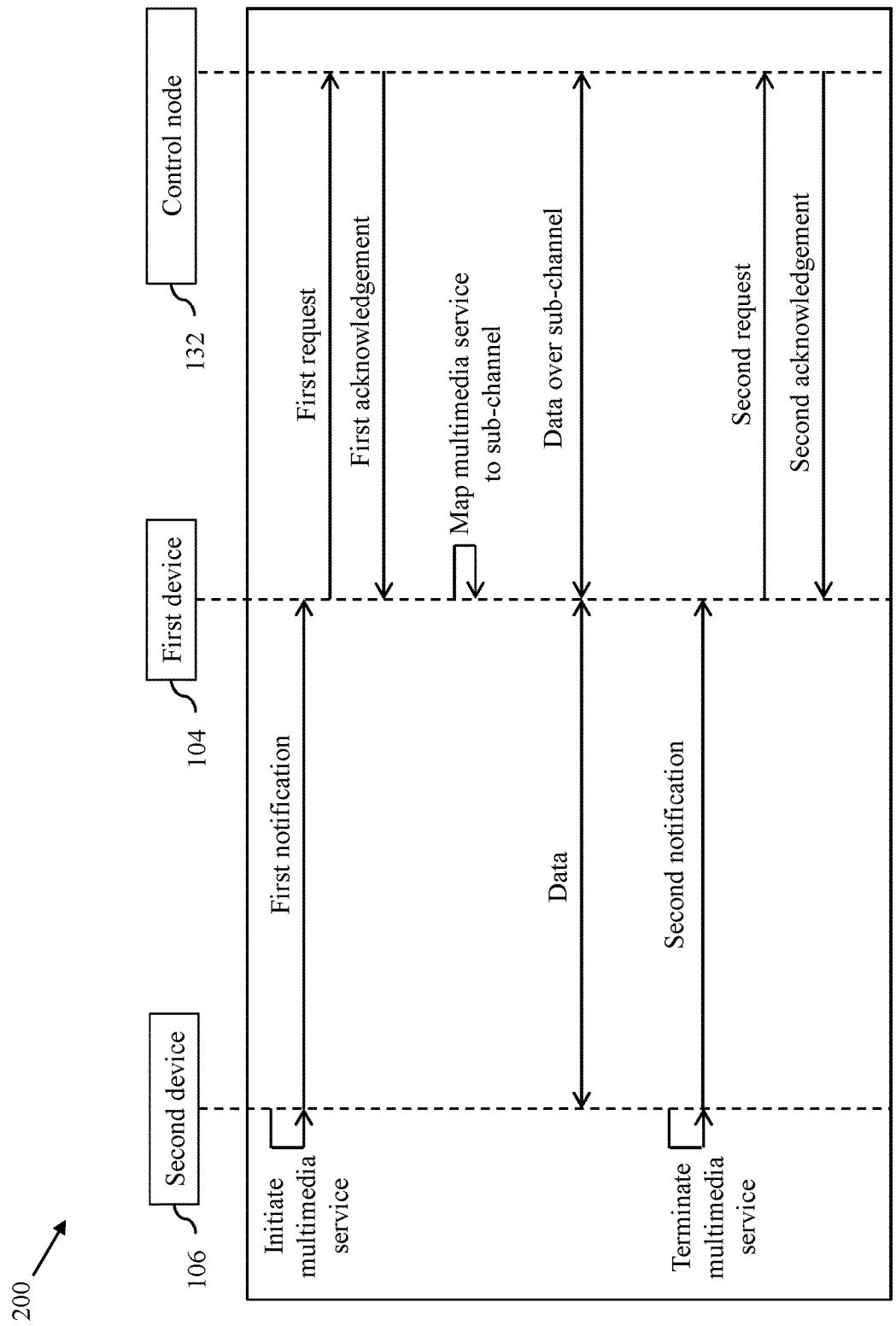
FIG. 2 is a process flow diagram that illustrates management of multimedia services by using the system environment of FIG. 1, in accordance with an embodiment of the present invention.

Referring now to FIG. 2, a process flow diagram that illustrates management of multimedia services 200 by using system environment 100 of FIG. 1, in accordance with an embodiment of the present invention, is shown.

The second device 106 renders a graphical user interface (GUI) on the display screen (not shown) of the second device 106. The GUI enables the customer to provide inputs for initiating or terminating the multimedia services. The customer selects the first multimedia service and the second device 106 initiates the first multimedia service based on the selection. The second device 106 transmits the first notification to the first device 104 by using the second transceiver 126.

The first device 104 receives the first notification by way of the second communication network 112. Based on the first notification, the first device 104 transmits the first request to the control node 132 for reserving the sub-channel for the first multimedia service. The control node 132 reserves the sub-channel based on the first request. The bandwidth of the sub-channel is reserved based on the first set of parameters associated with the first multimedia service. Further, the control node 132 transmits the first acknowledgement to the first device 104 to indicate that the sub-channel is reserved successfully. The first device 104 receives the first acknowledgement. The first device 104 maps the sub-channel to the first multimedia service based on the first acknowledgement. Further, the first device 104 transmits and receives the data associated with the first multimedia service over the sub-channel based on the mapping.

In an embodiment, the customer may further use the GUI to terminate the first multimedia service. The second device 106 transmits the second notification to the first device 104. The first device 104 receives the second notification by way of the second communication network 112. Based on the second notification, the first device 104 transmits the second request to the to the control node 132 for releasing the sub-channel. Based on the second request, the control node 132 releases the sub-channel and transmits the second acknowledgement to the first device 104 to indicate that the sub-channel is released successfully. Based on the second acknowledgement the first device 104 updates the mapping of the sub-channel to the first multimedia service.

Figure 3A:
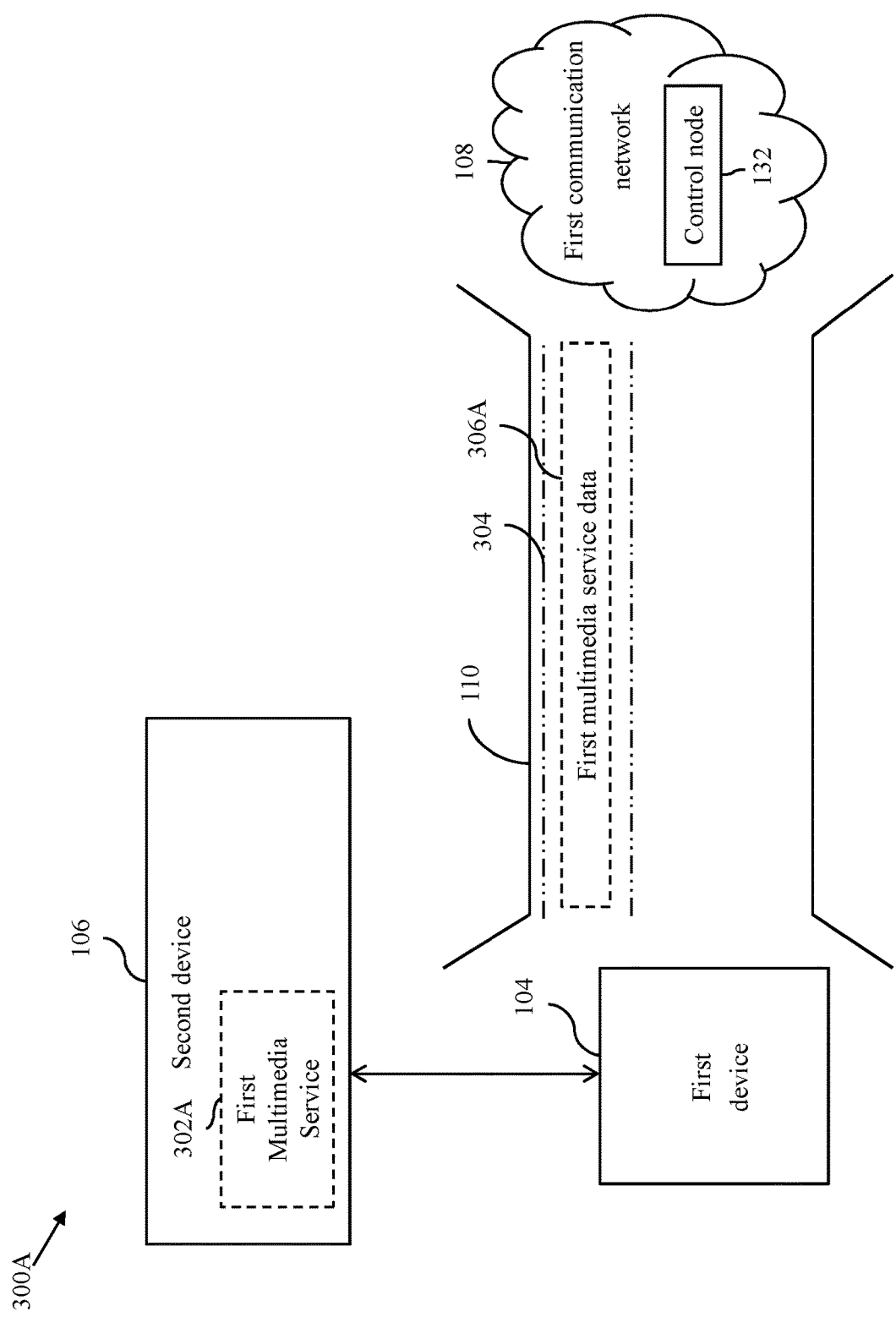
FIG. 3A-3C are block diagrams that illustrate first through third exemplary scenarios for managing multimedia services by using the system environment of FIG. 1, in accordance with an embodiment of the present invention.
Figure 3B:
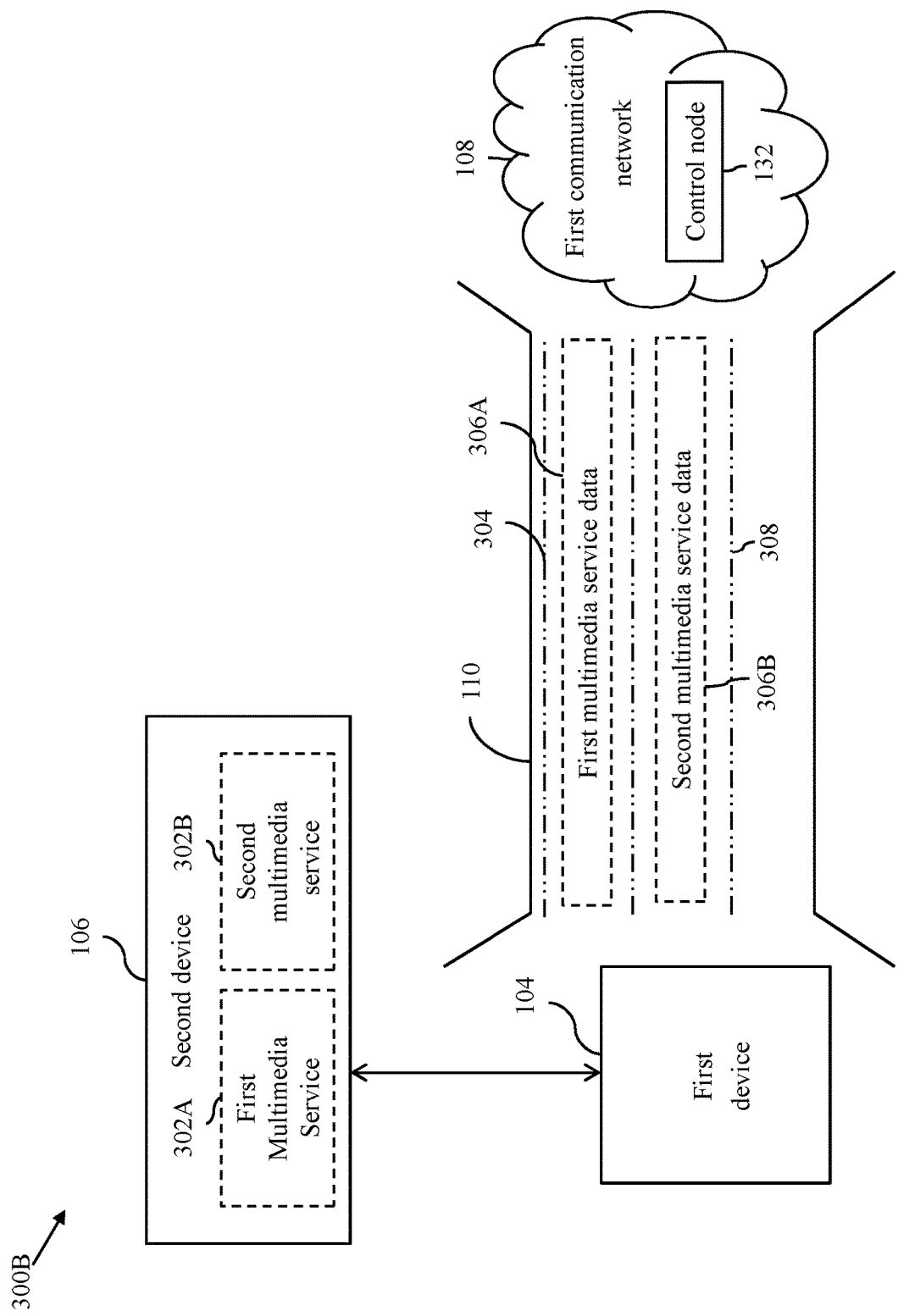
Figure 3C:
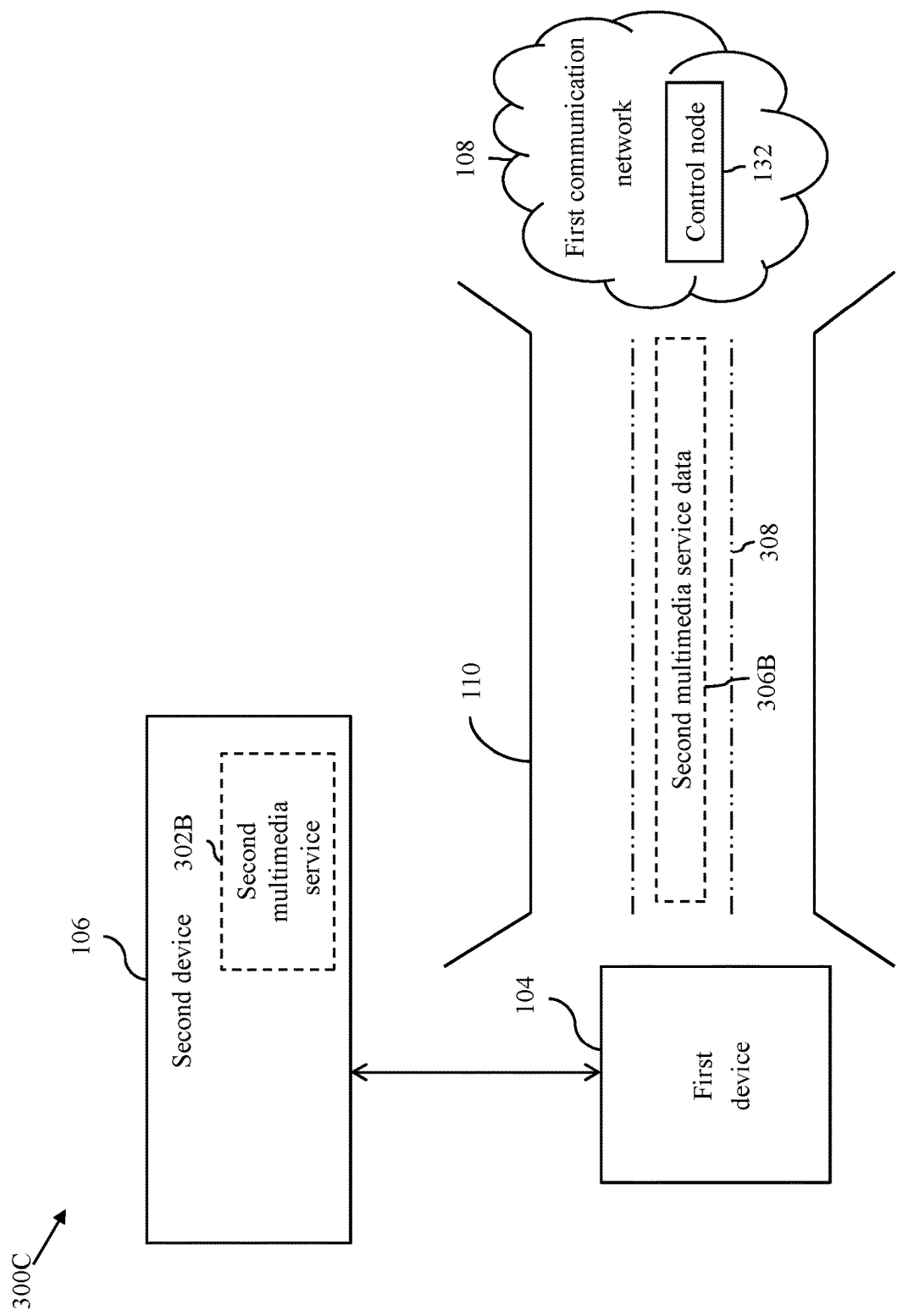

Referring now to FIGS. 3A-3C, block diagrams that illustrate first through third exemplary scenarios 300A-300C for managing the multimedia services by using the system environment of FIG. 1 in accordance with an embodiment of the present invention are shown.

In the first exemplary scenario 300A, the customer initiates a first multimedia service 302A on the second device 106. The first device 104 transmits the first request to the first communication network 108, when the first multimedia service 302A is initiated on the second device 106. The control node 132 reserves a first sub-channel 304 for the first multimedia service 302A based on the first request. A bandwidth of the first sub-channel 304 is a part of the total bandwidth of the communication channel 110. The first device 104 maps the first sub-channel 304 to the first multimedia service 302A. Hence, the first device 104 transmits and receives data associated with the first multimedia service 302A, i.e., first multimedia service data 306A, over the first sub-channel 304, thereby managing a quality of service for the first multimedia service 302A.

In the second exemplary scenario 300B, the customer initiates a second multimedia service 302B on the second device 106, while the first multimedia service 302A is already initiated. The first device 104 further transmits the first request to the first communication network 108, when the second multimedia service 302B is initiated. The control node 132 reserves a second sub-channel 308 for the second multimedia service 302B based on the first request. A bandwidth of the second sub-channel 308 is a part of the total bandwidth of the communication channel 110. Hence, the first and second sub-channels 304 and 308 coexist in the communication channel 110. The first device 104 further maps the second sub-channel 308 to the second multimedia service 302B. Hence, the first device 104 transmits and receives the first multimedia service data 306A over the first sub-channel 304 and data associated with the second multimedia service, i.e., second multimedia service data 306B, over the second sub-channel 308, thereby managing the quality of service for the first and second multimedia services 302A and 302B.

In the third exemplary scenario 300C, the customer terminates the first multimedia service 302A, while accessing the second multimedia service 302B. The first device 104 transmits the second request to the first communication network 108 to release the first sub-channel 304. The control node 132 releases the first sub-channel 304 based on the second request. However, the second sub-channel 308 remains reserved for the second multimedia service 302B, which the customer is accessing currently. Hence, the bandwidth of the first sub-channel 304 is free to use for any other multimedia services.

Figure 4:
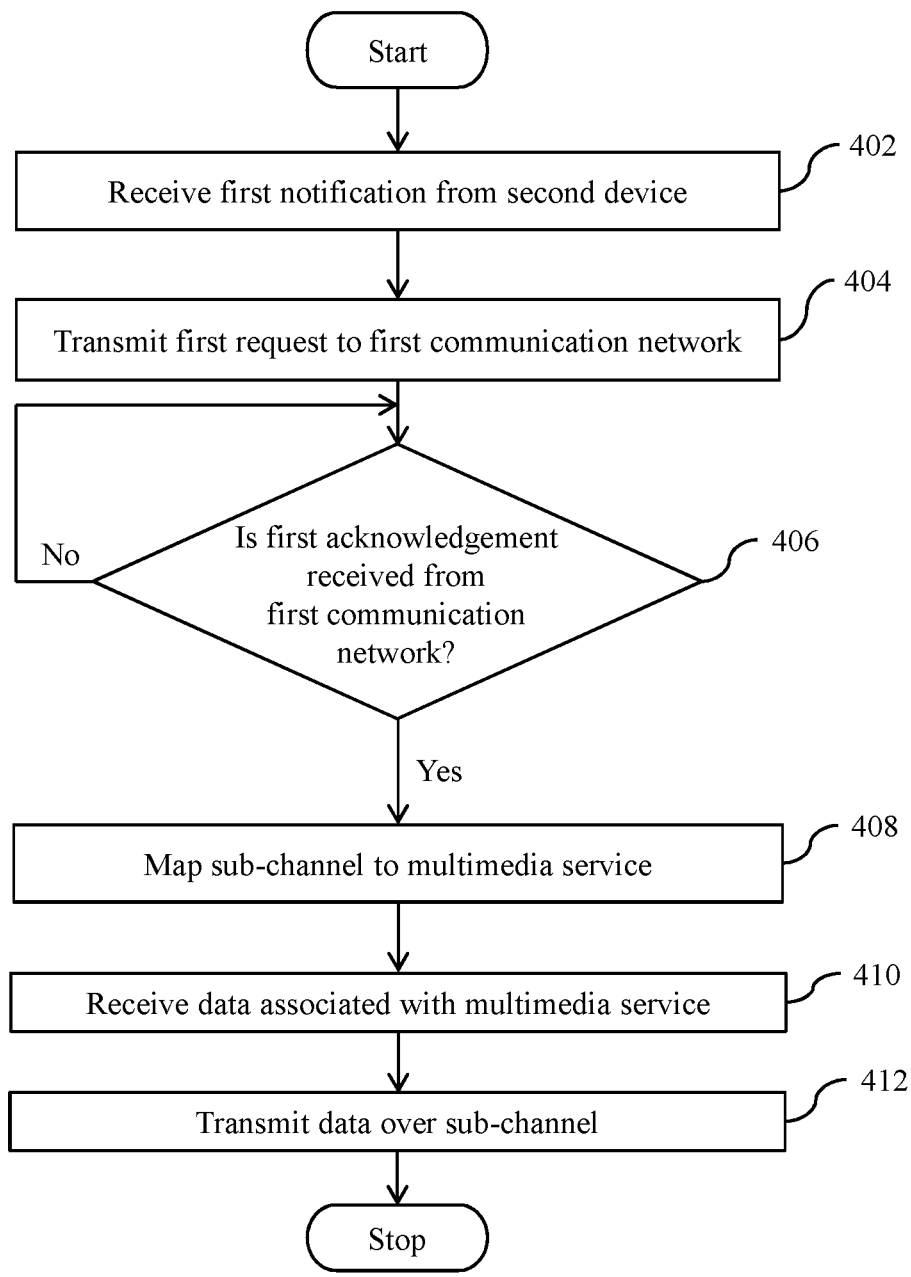
FIG. 4 is a flow chart that illustrates a method for reserving a sub-channel for managing a multimedia service, in accordance with an embodiment of the present invention.

Referring now to FIG. 4, a flow chart 400 that illustrates a method for reserving a sub-channel for managing a multimedia service in accordance with an embodiment of the present invention is shown. At step 402, the first device 104 receives the first notification from the second device 106. The first notification indicates initiation of the multimedia service, such as the first or second multimedia service 302A or 302B, on the second device 106. At step 404, the first device 104 transmits the first request to the first communication network 108 for reserving a sub-channel for the multimedia service.

At step 406, the first device 104 determines whether the first acknowledgement is received from the first communication network 108. The first acknowledgement indicates that the control node 132 has reserved the sub-channel, such as the first or second sub-channel 304 or 308, for the multimedia service. If at step 406, it is determined that the first acknowledgement is not received, step 406 is performed. If at step 406, it is determined that the first acknowledgement is received, step 408 is performed.

At step 408, the first device 104 maps the sub-channel to the multimedia service. At step 410, the first device 104 receives data associated with the multimedia service from the second device 106 by way of the second communication network 112. At step 412, the first device 104 transmits the data to the server 114 over the sub-channel channel. In another embodiment, the first device 104 receives data from the server 114 over the sub-channel.

Figure 5:
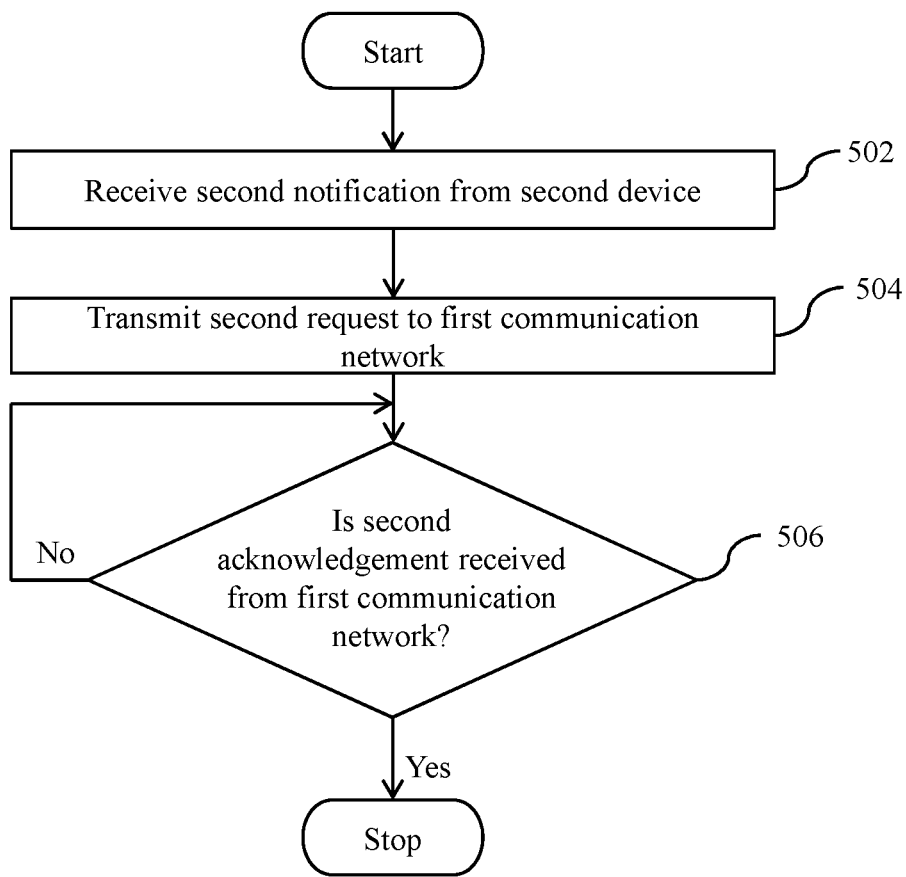
FIG. 5 is a flow chart that illustrates a method for releasing a sub-channel for managing a multimedia service, in accordance with an embodiment of the present invention.

Referring now to FIG. 5, a flow chart 500 that illustrates a method for releasing a sub-channel for managing a multimedia service, in accordance with an embodiment of the present invention is shown. At step 502, the first device 104 receives the second notification from the second device 106. The second notification indicates termination of the multimedia service on the second device 106. At step 504, the first device 104 transmits the second request to the first communication network 108 for releasing the sub-channel reserved for the multimedia service.

At step 506, the first device 104 determines whether the second acknowledgement from the first communication network 108 is received. The second acknowledgement indicates that the control node 132 has released the sub-channel, such as the first or second sub-channel 304 or 308. If at step 506, it is determined that the second acknowledgement is not received, step 506 is performed. If at step 506, it is determined that the second acknowledgement is received the first device 104 updates the mapping of the multimedia service to the sub-channel.

Figure 6:
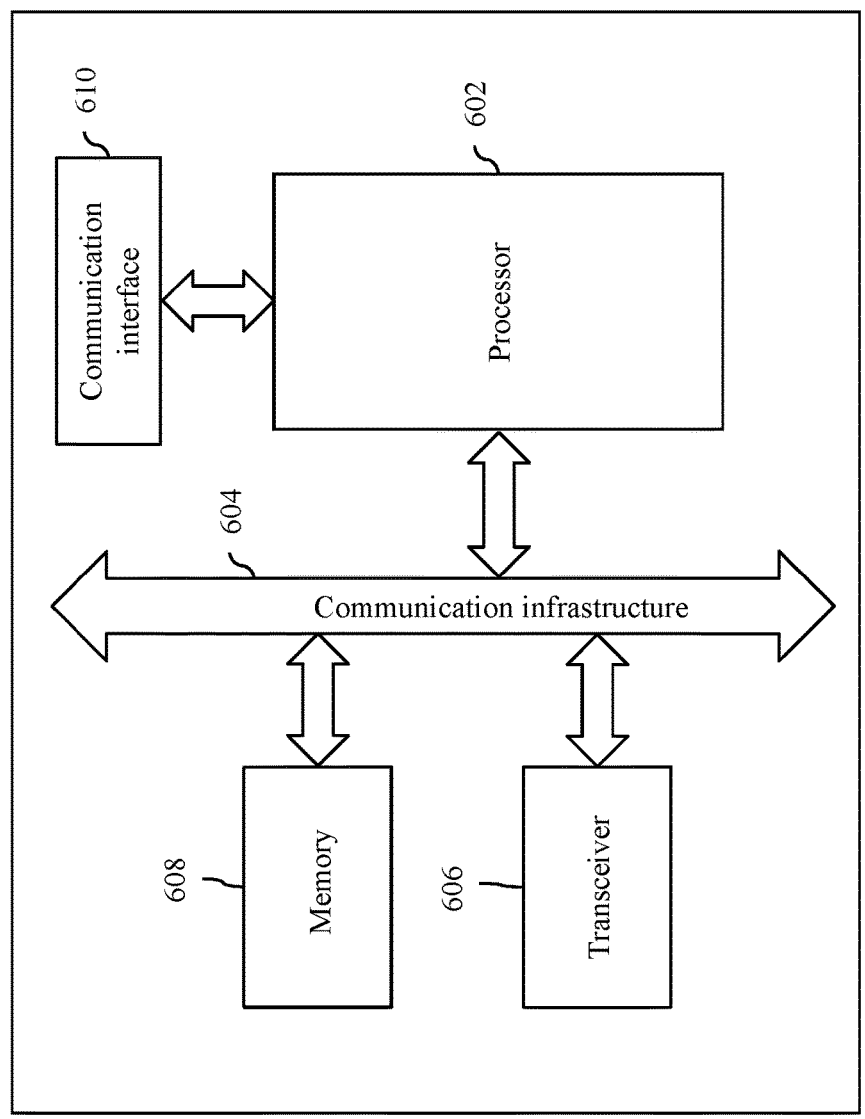
FIG. 6 is a block diagram that illustrates a system architecture of a computer system for managing the multimedia services, in accordance with an embodiment of the present invention.

Referring now to FIG. 6, a block diagram that illustrates system architecture of a computer system 600 for managing the multimedia services in accordance with an embodiment of the present invention is shown. An embodiment of present invention, or portions thereof, may be implemented as computer readable code on the computer system 600. In one example, the first device 104, the second device 106, the first and second communication networks 108 and 112, and the server 114 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 2, FIGS. 3A-3C, FIG. 4, and FIG. 5.

The computer system 600 includes a processor 602 that may be a special purpose or a general purpose processing device. The processor 602 may be a single processor, multiple processors, or combinations thereof. The processor 602 may have one or more processor "cores." In one example, the processor 602 is an octa-core processor. In another example, the processor 602 is the first or second processor 116 or 124. Further, the processor 602 may be connected to a communication infrastructure 604, such as a bus, i.e., the first bus 122 and the second bus 130, message queue, multi-core message-passing scheme, and the like. The computer system 600 further includes a transceiver 606 and a memory 608. Examples of the transceiver 606 may include antenna, a radio frequency transceiver, a wireless transceiver, a Bluetooth transceiver, and the like. Examples of the memory 608 may include RAM, ROM, dynamic RAM (DRAM), removable storage devices and the like. In one example, the memory 608 is the first or second memory 120 or 128. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 600 further includes a communication interface 610. The communication interface 610 may allow data to be transferred between the computer system 600 and various devices that are communicatively coupled to the computer system 600. Examples of the communication interface 610 may include a modem, a network interface, i.e., an Ethernet card, a communications port, and the like. Data transferred via the communication interface 610 corresponds to signals, such as electronic, electromagnetic, optical, or other signals as will be apparent to a person skilled in the art. The signals may travel via a communications channel, such as the communication channel 110, which transmits the signals to devices that are communicatively coupled to the computer system 600. Examples of the communications channel include, but are not limited to, cable, fiber optics, a phone line, a cellular phone link, or a radio frequency link.

Computer program medium and computer usable medium may refer to memories, such as the memory 608, which may be a semiconductor memory such as a DRAM. The computer program medium may provide data that enables the computer system 600 to implement the methods illustrated in FIG. 2, FIGS. 3A-3C, FIG. 4, and FIG. 5. In an embodiment, the present invention is implemented using a computer implemented application, the computer implemented application may be stored in a computer program product and loaded into the computer system 600 using the removable storage drive or the hard disc drive in the memory 608, or the communication interface 610.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 602 and a memory such as the memory 608 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present invention provide, among other features, systems and methods for managing multimedia services. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for managing multimedia services, comprising:

transmitting, by a first device, a first request and a second request to a first communication network, wherein the first request is transmitted based on an initiation of a first multimedia service at a second device and the second request is transmitted based on an initiation of a second multimedia service at the second device, wherein the first request reserves a first sub-channel of a communication channel for the first multimedia service and the second request reserves a second sub-channel of the communication channel for the second multimedia service, and wherein the first device communicates with the first communication network over the communication channel, and wherein the first device is different from the second device and the first multimedia service is different from the second multimedia service;

receiving, by the first device, a first acknowledgement and a second acknowledgement from the first communication network, wherein the first acknowledgement acknowledges the reservation of the first sub-channel and the second acknowledgement acknowledges the reservation of the second sub-channel;

mapping, by the first device, the first multimedia service to the first sub-channel based on the first acknowledgement and the second multimedia service to the second sub-channel based on the second acknowledgement;

storing, by the first device, in a look-up table, a first entry to indicate the mapping of the first sub-channel to the first multimedia service and a second entry to indicate the mapping of the second sub-channel to the second multimedia service, wherein the first entry includes a multimedia identification number of the first multimedia service and a sub-channel identification number of the first sub-channel;

receiving, from the second device, by the first device, first data associated with the first multimedia service and second data associated with the second multimedia service; and transmitting, by the first device, the first data over the first sub-channel based on the mapping of the first multimedia service to the first sub-channel and the second data over the second sub-channel based on the mapping of the second multimedia service to the second sub-channel, wherein the first data is transmitted over the first sub-channel further based on the first entry and the second data is transmitted over the second sub-channel further based on the second entry, and wherein the first entry is deleted from the look-up table based on a termination of the first multimedia service at the second device and a release of the first sub-channel.

2. The method of claim 1, further comprising receiving, by the first device, a first notification and a second notification from the second device, wherein the first notification indicates the initiation of the first multimedia service at the second device and the second notification indicates the initiation of the second multimedia service at the second device.

3. The method of claim 1, further comprising receiving, by the first device, a notification from the second device, wherein the notification indicates the termination of the first multimedia service at the second device.

4. The method of claim 1, further comprising transmitting, by the first device, a third request to the first communication network based on the termination of the first multimedia service at the second device, wherein the third request releases the first sub-channel.

5. The method of claim 4, further comprising receiving, by the first device, a third acknowledgement from the first communication network based on the third request, wherein the third acknowledgement indicates the release of the first sub-channel while the second sub-channel remains reserved.

6. The method of claim 1, wherein the first device communicates with the second device over a second communication network.

7. The method of claim 1, wherein a first bandwidth of the first sub-channel and a second bandwidth of the second sub-channel are parts of a total bandwidth of the communication channel.

8. The method of claim 1, wherein the first request is transmitted further based on at least a first parameter associated with the first multimedia service and the second request is transmitted further based on at least a second parameter associated with the second multimedia service, and wherein the first sub-channel is reserved based on the first parameter and the second sub-channel is reserved based on the second parameter.

9. The method of claim 1, wherein the communication channel is a primary bearer channel, and wherein the first sub-channel and the second sub-channel are secondary bearer channels.

10. The method of claim 1, wherein the first and second devices are in a vehicle.

11. The method of claim 10, further comprising:
transmitting, by the first device, a third request to the first communication network based on ending of an ongoing ride associated with the vehicle, wherein the third request releases the first sub-channel and the second sub-channel; and
receiving, by the first device, a third acknowledgement from the first communication network based on the third request, wherein the third acknowledgement indicates the release of the first sub-channel and the second sub-channel.

12. A system for managing multimedia services, comprising:
a first device comprising:
a processor that is configured to:
transmit a first request and a second request to a first communication network, wherein the first request is transmitted based on an initiation of a first multimedia service at a second device and the second request is transmitted based on an initiation of a second multimedia service of the second device, wherein the first request reserves a first sub-channel of a communication channel for the first multimedia service and the second request reserves a second sub-channel of the communication channel for the second multimedia service, and wherein the first device communicates with the first communication network over the communication channel, and wherein the first device is different from the second device and the first multimedia service is different from the second multimedia service;
receive a first acknowledgement and a second acknowledgement from the first communication network, wherein the first acknowledgement-acknowledges the reservation of the first sub-channel and the second acknowledgement acknowledges the reservation of the second sub-channel;
map the first multimedia service to the first sub-channel based on the first acknowledgement and the second multimedia service to the second sub-channel based on the second acknowledgement;
store, in a look-up table, a first entry to indicate the mapping of the first sub-channel to the first multimedia service and a second entry to indicate the mapping of the second sub-channel to the second multimedia service, wherein the first entry includes a multimedia identification number of the first multimedia service and a sub-channel identification number of the first sub-channel;
receive, from the second device, first data associated with the first multimedia service and second data associated with the second multimedia service; and
transmit the first data over the first sub-channel based on the first multimedia service mapped to the first sub-channel and the second data over the second sub-channel based on the second multimedia service mapped to the second sub-channel, wherein the first data is transmitted over the first sub-channel further based on the first entry and the second data is transmitted over the second sub-channel further based on the second entry, and wherein the first entry is deleted from the look-up table based on a termination of the first multimedia service at the second device and a release of the first sub-channel.

13. The system of claim 12, wherein the processor is further configured to receive a first notification and a second notification from the second device, and wherein the first notification indicates the initiation of the first multimedia service at the second device and the second notification indicates the initiation of the second multimedia service at the second device.

14. The system of claim 12, wherein the processor is further configured to receive a notification from the second device, and wherein the notification indicates the termination of the first multimedia service at the second device.

15. The system of claim 12, wherein the processor is further configured to transmit a third request to the first communication network based on the termination of the first multimedia service at the second device, and wherein the third request releases the first sub-channel.

16. The system of claim 15, wherein the processor is further configured to receive a third acknowledgement from the first communication network based on the third request, wherein the third acknowledgement indicates the release of the first sub-channel while the second sub-channel remains reserved.

17. The system of claim 12, wherein the first device communicates with the second device over of a second communication network.

18. The system of claim 12, wherein a first bandwidth of the first sub-channel and a second bandwidth of the second sub-channel are parts of a total bandwidth of the communication channel.

* * * * *